United States Patent
Luo et al.

(10) Patent No.: US 12,210,584 B2
(45) Date of Patent: Jan. 28, 2025

(54) ECOLOGICAL FLOW DETERMINATION METHOD FOR CONSIDERING LIFTING AMOUNT

(71) Applicant: Xi'an University of Technology, Xi'an (CN)

(72) Inventors: Jungang Luo, Xi'an (CN); Dandan Liu, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 880 days.

(21) Appl. No.: 17/361,327

(22) Filed: Jun. 29, 2021

(65) Prior Publication Data

US 2021/0326408 A1 Oct. 21, 2021

Related U.S. Application Data

(63) Continuation-in-part of application No. PCT/CN2020/129023, filed on Nov. 16, 2020.

(30) Foreign Application Priority Data

Dec. 5, 2019 (CN) .......................... 201911236748.0

(51) Int. Cl.
*G06F 17/18* (2006.01)
*E02B 1/00* (2006.01)
*G01C 13/00* (2006.01)

(52) U.S. Cl.
CPC ................ *G06F 17/18* (2013.01); *E02B 1/00* (2013.01); *G01C 13/002* (2013.01); *G06F 2219/10* (2013.01)

(58) Field of Classification Search
None
See application file for complete search history.

(56) References Cited

FOREIGN PATENT DOCUMENTS

CN 109784527 A * 5/2019

OTHER PUBLICATIONS

Haifeng Jia, Calculation of the minimum ecological water requirement of an urban river system and its deployment: A case study in Beijing central region, Jun. 20, 2011 (Year: 2011).*

(Continued)

*Primary Examiner* — Kamini S Shah
*Assistant Examiner* — Michael Paul Mirabito

(57) ABSTRACT

An ecological flow determination method for considering a lifting amount a belongs to a technical field of environmental engineering and includes the following steps: collecting, by a collecting device, data needed to calculate an ecological flow; determining, by a calculating device, an ecological base flow; selecting an upper limit and a lower limit of the ecological base flow so as to determine a range of the ecological base flow; verifying the lower limit of the ecological base flow; calculating water demands of landscape wetland, sediment discharge and dilution self purification of three service objects; comparing the water demands of the three service objects so as to determine the lifting amount, and finding out a minimum value and a maximum value to determine a lower limit and an upper limit of the lifting amount in the range; combining the ecological base flow and the lifting amount to determine the ecological flow.

3 Claims, 2 Drawing Sheets

(56) References Cited

OTHER PUBLICATIONS

Jennifer L. McConnachie, Seasonal Variability of Fine-Grained Sediment Morphology in a Salmon-Bearing Stream, Aug. 2003 (Year: 2003).*
How TVA Manages Water Levels, Oct. 23, 2019 (Year: 2019).*
Zhenghao Zhang, Ecohydrological effects of water reservoirs with consideration of asynchronous and synchronous concurrences of high- and low-flow regimes, Mar. 14, 2018 (Year: 2018).*

* cited by examiner

ECOLOGICAL FLOW DETERMINATION METHOD FOR CONSIDERING LIFTING AMOUNT

CROSS-REFERENCE TO RELATED APPLICATIONS

This application is a continuation in part of International Application No. PCT/CN2020/129023, filed on Nov. 16, 2020, which claims priority to Chinese Application No. 201911236748.0, filed on Dec. 5, 2019, the content of which is hereby incorporated by reference in its entirety.

BACKGROUND

1. Technical Field

The present disclosure generally relates to a technical field of environmental engineering, and especially relates to an ecological flow determination method for considering lifting amount.

2. Description of Related Art

There are no ecological flow problems in rivers and lakes, because aquatic animals and plants grow naturally according to habitats of the rivers and lakes. However, since water consumption inside and outside rivers and lakes is increasing, water quantity of the rivers and lakes which are depended on by natural ecosystems is continuously occupied, so that base flow is not enough, thereby causing a problem of a so-called ecological flow for a long time.

Two concepts related to the ecological flow are an ecological base flow and an ecological water demand, the ecological base flow is a minimum flow required to maintain a basic form and a basic ecological function of a river, with a function scope of natural ecosystems, and an emphasis of continuous flows of river channels. Due to uneven spatial and temporal distributions of runoff, a total water demand can't ensure that the ecological base flow meets the basic ecological function of the river in per unit time, so it is necessary to put forward requirements for a base flow in a process of water demand, and for a definition of the ecological base flow, the community has basically reached an agreement. At present, water resource shortage, water ecological damage and the like become normal problems, on the basis, a priority of water utilization is provided for life, ecology and production, therefore, the ecological water demand has become a widely discussion object, the ecological flow is in connection with the ecological water demand. Some people think that the ecological water demand is water quantity required for maintaining a structure, a function and an ecological process of an ecosystem at a certain level, and refers to the water demand of the water ecosystem corresponding to a certain ecological protection target, and the ecological flow is a certain flow in the ecological water demand. While, some people think that the ecological flow is a combination of the ecological base flow and an ecological flow in a sensitive period. Such understanding of these concepts has influenced specific practices, most importantly, the ecological flow is difficult to be determined, which has led to confusion in management.

Furthermore, a technical method involved is to determine both the ecological base flow and the ecological flow. The ecological base flow is guided based on an algorithm, so that determination methods are divided into four categories, namely a hydrological method, a hydraulic method, a habitat rating method, and a holistic method. The ecological flow is determined according to water demand conditions of specific objects.

At present, there are many disputes about determination of the ecological flow, unclear concepts are occurred thereof, and a relationship between the ecological base flow and the ecological water demand is unclarified. Due to numerous ecological service objects, it is difficult to quantify the ecological water demand under different spatial and temporal distributions. The ecological flow is closely related to the ecological water demand, and corresponding algorithms are too many and too disordered. Firstly, a calculation result is not the ecological flow due to wrong understanding, secondly, data required by the algorithm can't be obtained, and parameters are difficult to be determined. A value or a group of values is only obtained by most calculation methods after considering a plurality of service objects, which can't be adapt to changes of time and space, water demand and water supply, in this way, it is difficult to be taken as a basis for assessment, which causes inconvenience to management.

Due to diversity of the ecological service objects in different spatial and temporal distributions, it is difficult to quantify the ecological water demand, and relevant departments assess the river channel according to an actually measured flow of a cross section at the present stage in order to keep continuous flow of the river channel. However, an assessment standard of the flow of the determined cross section is too high, so that the assessment is meaningless.

Therefore, the present application provides an ecological flow determination method for considering a lifting amount.

SUMMARY

The technical problems to be solved, in view of the shortcomings of the related art, the present disclosure relates to an ecological flow determination method for considering a lifting amount which can simplify a complex problem, and simultaneously propose that an ecological base flow is used as an assessment target, so that the method is more direct and effective; and provide an interval management of the ecological flow so as to embody a natural attribute and a functional attribute, and emphasize service attributes of ecological services.

In order to achieve the above purpose, the present disclosure provides the following technical scheme, an ecological flow determination method for considering a lifting amount, includes the following steps:

step S100, collecting and storing, by a collecting device, relevant data needed to calculate an ecological flow;

step S101, determining, by a calculating device, an ecological base flow, according to the relevant data that has been stored, wherein a determination method includes an improved Montana method, an annual distribution method and a minimum monthly average flow method;

step S102, analyzing, by the calculating device, the ecological base flows $M_1$, $M_2$ and $M_3$ respectively determined by the improved Montana method, the annual distribution method and the minimum monthly average flow method; taking a maximum value and a minimum value respectively selected from the ecological base flows $M_1$, $M_2$ and $M_3$ as an upper limit $Q_{max}$ and a lower limit $Q_{min}$ of the ecological base flow to preliminarily determine a range $[Q_{min}, Q_{max}]$ of the ecological base flow, and preliminarily determining the lower limit $Q_{min}$ of the range $[Q_{min}, Q_{max}]$ as a lower limit of the ecological base flow, shown in formulas (1) and (2):

$$Q_{min} = \min\{M_1, M_2, M_3\} \quad (1)$$

$$Q_{max} = \max\{M_1, M_2, M_3\} \quad (2)$$

step S103, verifying, by the calculating device, the lower limit $Q_{min}$ of the ecological base flow shown in the step S102;

if the lower limit $Q_{min}$ of the ecological base flow that has been preliminarily determined is larger than a specified value, taking the lower limit $Q_{min}$ as the lower limit of the ecological base flow; if the lower limit $Q_{min}$ of the ecological base flow that has been preliminarily determined is less than or equal to the specified value, taking the specified value as the lower limit of the ecological base flow;

step S104, calculating, by the calculating device, water demands of three service objects in a river section on the basis of the ecological base flow, wherein the water demands of the three service objects include water demand $W_l$ of landscape wetland, water demand $W_s$ of sediment discharge and water demand $W_c$ of dilution self-purification;

step S105, analyzing, by the calculating device, the water demands of the three service objects calculated in the step S104, to determine a lifting amount S;

determining a minimum value and a maximum value of the water demands of the three service objects, and respectively taking the minimum value and the maximum value of the water demands of the three service objects that has been determined as a lower limit $S_{min}$ and an upper limit $S_{max}$ of the lifting amount S;

$$S_{min} = \min\{W_l, W_s, W_c\} \quad (3)$$

$$S_{max} = \max\{W_l, W_s, W_c\} \quad (4)$$

step S106, combining, by the calculating device, the ecological base flow and the lifting amount S to comprehensively determine the ecological flow, and then transmitting the ecological flow to an output device; and taking the lower limit of the ecological base flow verified in the step S103 as a lower limit of the ecological flow, and taking the upper limit of the lifting amount S as an upper limit of the ecological flow.

Preferably, the step S100 of collecting the relevant data by the collecting device includes a river sediment concentration, a sediment discharge, a period of water exchange, a multi-year average water storage, a pollutant concentration, a target water quality concentration and long-series historical flow data.

Preferably, in the step S101, the improved Montana method considers to select a typical year and determine a periodization percentage on the basis of a Montana method, the typical year selected according to a year with a modulus of different seasons closest to 1.0; the periodization is that one year is divided into a general water use period and a fish spawning period, and 10% and 30% of an average flow of the typical year taken as the ecological base flow, respectively;

the annual distribution method configured to obtain an annual ecological base flow process of a year by multiplying a multi-year average monthly runoff by a contemporaneous average ratio, the contemporaneous average ratio determined and quantified according to two typical hydrological characteristic variables that include the multi-year average monthly runoff and an annual average value of a minimum monthly average runoff of each month in the year, specifically shown in formulas (5)-(10):

$$\overline{Q} = \frac{1}{12}\sum_{i=1}^{12} \overline{q_i} \quad (5)$$

$$\overline{q_i} = \frac{1}{n}\sum_{j=1}^{n} q_{ij} \quad (6)$$

$$\overline{Q_{min}} = \frac{1}{12}\sum_{i=1}^{12} q_{min(i)} \quad (7)$$

$$q_{min(i)} = \min(q_{ij}) \quad (8)$$

$$\eta = \overline{Q_{min}}/\overline{Q} \quad (9)$$

$$Q_i = \overline{q_i} * \eta \quad (10)$$

wherein, $\overline{q_i}$ is the multi-year monthly average runoff of an i-th month; $\overline{Q}$ is the multi-year annual average runoff; $q_{ij}$ is a monthly average runoff of the i-th month in a j-th year; $q_{min(i)}$ is a multi-year minimum monthly average runoff of the i-th month; $\overline{Q_{min}}$ is a minimum annual average runoff; n is number of statistical years, $\eta$ is the contemporaneous average ratio, and $Q_i$ is the ecological base flow of each month;

the minimum monthly average flow method configured to take a multi-year average value of a minimum monthly average flow as the ecological base flow of a river channel, specifically shown in a formula (11):

$$Q_m = \sum_{i=1}^{n} \min Q_{ij}/n \quad (11)$$

wherein, $Q_{ij}$ is an average flow of a j-th day of the i-th month, $Q_m$ is an ecological base flow of an m-th month, and n is the number of statistical years.

Preferably, specific calculation ways of the water demand $W_l$ of the landscape wetland, the water demand $W_s$ of the sediment discharge and the water demand $W_c$ of the dilution self-purification in the step S104 are as follows:

(1) the water demand $W_l$ of the landscape wetland, shown in a formula (12):

$$W_l = \frac{w''}{T} \quad (12)$$

wherein, T is periods of water exchange, and w" is a multi-year average water storage;

(2) the water demand $W_s$ of the sediment discharge shown in formulas (13)-(15):

$$W_s = \eta^\alpha * W_w \quad (13)$$

$$W_w = W - W'/\gamma^s \quad (14)$$

$$\eta = S_m - S_n \quad (15)$$

wherein, $\eta$ is efficiency of sediment discharge, $\alpha$ is an index, $W_w$ is a net water flow, W is a runoff, W' is sediment discharge, $\gamma_s$ is sediment bulk density, $S_m$ is a sediment concentration at an inflow of the river section, $S_n$ is a sediment concentration at an outflow of the river section; when $\eta<1$, the river section is in a flushing state, the sediment concentration at the inflow of the river section is less than that of the outflow of the river section, and $\alpha$ is 1; when $\eta>=1$, the river section is deposited or keeps a balance of erosion and deposition, and $\alpha$ is 0;

(3) the water demand $W_c$ of the dilution self-purification, using a mixed model and an attenuation model are to simulate the water demand $W_c$ of the dilution self-purification in the river section; at an i-th section of the river section, an upper section is $A_{i-1}$, a lower section is $A_i$, a length of the river section is $L_i$, it is assumed that pollutant of a plurality of sewage outlets and branches are imported into the river section, which are recorded as a section B, a specific formula shown in a formula (16):

$$W_{ci} = \frac{C_{i-1}Q_{i-1}\exp\left(-\frac{kL_i}{u_i}\right)_i + q_i s_i \exp\left(-\frac{k(L_i - x_i)}{u_i}\right) - C_{si}q_i}{C_{si}} * T \qquad (16)$$

wherein, $W_{ci}$ is the water demand of the dilution self-purification of the i-th river section, $C_{i-1}$ is a pollutant concentration at the upper section $A_{i-1}$, is a pollutant concentration imported into the section B, $q_i$ is an import flow at the section B, $C_{si}$ is a target water quality concentration at the lower section Ai, $L_i$ is a length of the river section, $u_i$ is a current velocity of the i-th section of the river section, $x_i$ is a distance between the section B and the upper section $A_{i-1}$, and $Q_{i-1}$ is a flow at the upper section $A_{i-1}$.

The present disclosure provides advantages as below, (1) From a perspective of practical applications, the ecological flow determination method is provided from a concept, that is, the ecological base flow pluses the lifting amount. Comparing with characteristics that ecological water demand of a specific service object is difficult to be quantified, the present disclosure can simplify a complex problem, and simultaneously propose that the ecological base flow is used as an assessment target, so that the method is more direct and effective; in addition, the present disclosure can further provide an interval management of the ecological flow so as to embody a natural attribute and a functional attribute, and emphasize service attributes of ecological services.

(2) The present disclosure can also solve the problem that the ecological flow is difficult to be quantified, and avoid management confusions caused by numerous ecological flow algorithms and complex service objects. And then, the present disclosure can provide a range with stronger adaptability, at the same time, considering assessment requirements and using the ecological flow as a judgment of whether the assessment reaches a standard or not, so that the assessment is more easily accepted, and the assessment becomes simple, effective, clear and manageable.

DETAILED DESCRIPTION

Figure 1:
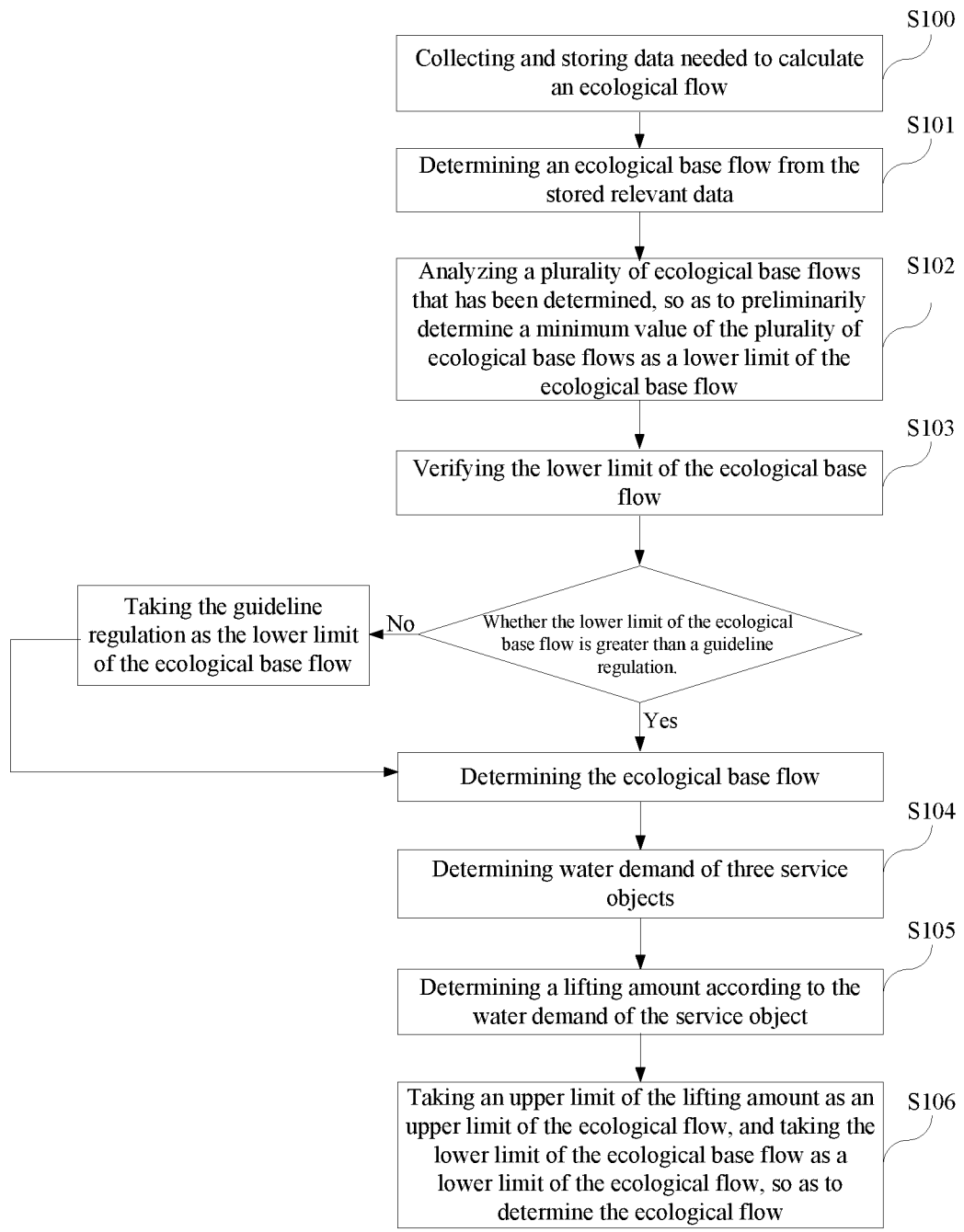
FIG. 1 is a flowchart of an ecological flow determination method for considering a lifting amount in accordance with an embodiment of the present disclosure.

In order to better understand and implement the technical scheme of the present disclosure for one of ordinary skilled in the art, the present disclosure is further described in detail in conjunction with embodiments and accompanying drawings below, but the examples cited are provided only to interpret the present disclosure, but not to limit the scope of the present disclosure.

First Embodiment

The embodiment of the present disclosure gives a definition of an ecological flow on the basis of analyzing concepts of an ecological base flow, an ecological water demand and the ecological flow, and explains a determination method of the ecological flow from the definition. The ecological base flow has been explained above, and it needs to be emphasized that the most important characteristic of the ecological base flow is to ensure continuous flows. Now, to explain a relationship between the ecological water demand and the ecological flow, the ecological water demand firstly needs to know what is an ecological object and how to service the ecological object, and then, how much is the ecological water demand and how much ecological flow is needed to ensure the ecological water demand correspondingly, so there is no basis for the ecological flow without talking about the ecological water demand.

The ecological water demand can be divided into two types: inside river and outside river. Specific service objects include a landscape, a fish, aquatic organisms, a river sediment discharge, and self-purification and so on, a function range includes a natural ecosystem and a social ecosystem, and water demand conditions include water demand and a water demand process. The ecological service objects of different rivers under different spatial and temporal scales are different, the ecological water demand is not only related to river changes in a natural state, but also influenced by social activities. Some functional water demands, such as the sediment discharge and the self-purification and the like, require both the water demand process and the water demand.

On the basis of the knowledge, the concept of the ecological flow is provided, the first step is to restore the ecology to an original ecology on the basis of the ecological base flow, which is almost impossible, but only can be improved and restored. Adding a lifting amount that can be large or small, and boundaries of the ecological flow are provided by using an interval thought. The second step is to regulate the method and establish a regulation library, for example, what regulation can be used in different seasons of different river sections, and in different service objects; considering how to allocate water quantity under spatial and temporal distributions, for example, in a dry season, there are good means, technologies and strong regulation abilities, which can meet the lifting amount on the basis of the base flow.

The present disclosure is described in detail below with reference to attached drawings and specific implementations.

Referring to FIG. 1, an ecological flow determination method for considering a lifting amount of the present disclosure is provided and includes the following steps:

step S100, collecting and storing, by a collecting device, relevant data needed to calculate an ecological flow. In an embodiment of the present disclosure, the relevant data includes long-series historical flow data, a period of water exchange, a river sediment concentration, a sediment discharge, a multi-year average water storage, a pollutant concentration, and a target water quality concentration.

The collecting device includes a sensor, a memory, etc, configured to collect the relevant data and installed in a hydrological station beside the river to collect data of the pollutant concentration and the target water quality concentration, and collect and store data configured to determine the long-series historical flow data, the periods of water exchange, the sediment concentration, the sediment discharge, and the multi-year average water storage. After obtaining the data, the collecting device is also configured to transmit the data to a data terminal, such as a flow totalizer, to obtain final relevant data.

Figure 2:
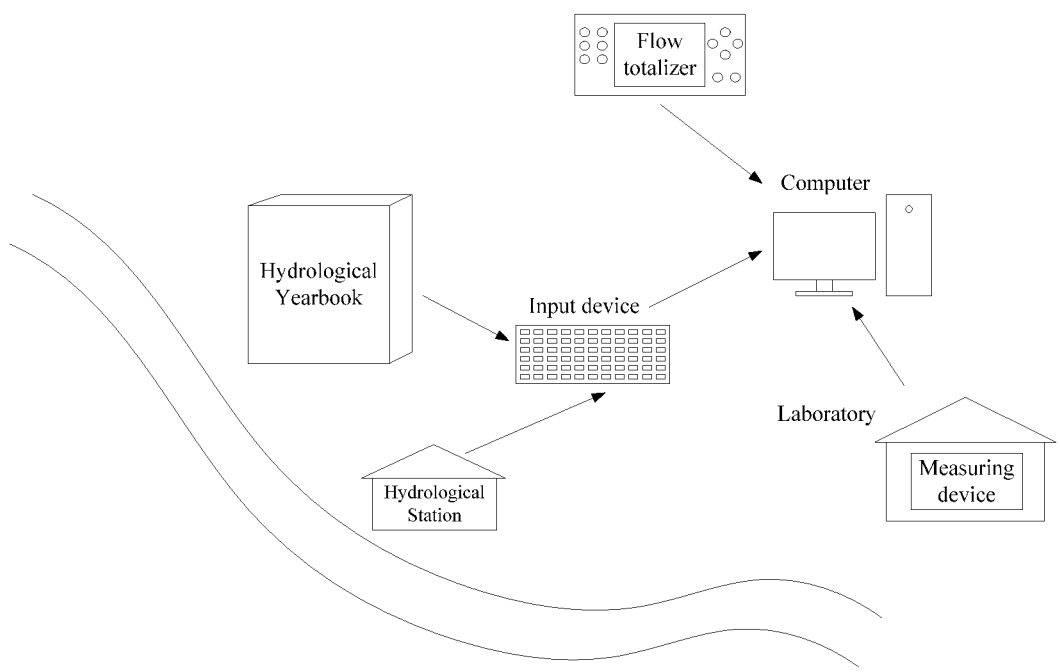
FIG. 2 is a block diagram of collecting relevant data in accordance with an embodiment of the present disclosure.

In an embodiment of the present disclosure, the long-series historical flow data can be obtained from the data recorded in the flow totalizer, or by querying the data recorded in a hydrological Yearbook or the hydrological station. After querying the hydrological Yearbook, the data can be input into a computer through an input device. The period of water exchange can be obtained by data calculation, and can be input into the computer after manual calculation or automatically calculated by the computer. The sediment concentration can be obtained by querying the data recorded by the hydrological station or by experiments. When monitoring water bodies such as rivers or lakes, the hydrological station needs to regularly collect hydrological data including a water level, a flow velocity, a flow direction, a wave, a sediment concentration, a water temperature and a water quality, and store these collected data in storage devices. A common collection method includes a visual observation, a scale measurement and a sampling experiment. For example, the sediment concentration of the river section can be obtained by taking a beaker sampling of a target water body, and standing to obtain precipitated sand. Drying the sand by a drying equipment to obtain a mass of the sand, and then combining with a volume of a water sample, the sediment concentration of the river section can be obtained through a calculating device. In the experiment, the water sample can be extracted from the river, and the sediment concentration of the river section can be measured in a laboratory, and then the calculated sediment concentration of the river section can be input into the computer through the input device. The sediment discharge and the multi-year average water storage can be obtained by querying the data recorded by the hydrological station. As mentioned above, the data stored in the hydrological station also include data of the sediment discharge of the river section and the multi-year average water storage. When the hydrological station obtains the sediment discharge of the river section, the sediment discharge of the river section can be directly calculated by the calculating device according to the sediment concentration and a flow of the river section. The multi-year average water storage can be measured by a measuring device such as a ruler to measure a depth of the river section. Combined with a width, a length and other data of the river section, water storages over the years can be obtained by the calculating device, and then an average of the water storages over the years can be calculated by the calculating device, so as to obtain the above-mentioned multi-year average water storage. In this way, the queried data can be input into the computer through the input device. The pollutant concentration and the target water quality concentration can be measured in the field of the river or in the laboratory after sampling, the measured data can be input into the computer through the input device, or be automatically input into the computer in the laboratory by the measuring device. For example, after a multi-parameter water pollutant measuring device is connected with the computer by cables, when sensors of the measuring device obtain data of the pollutant concentration and the water quality concentration, and then the data can be transmitted to the computer through a data interface and the cables, so that the computer can automatically store the data, which is as shown in FIG. 2.

Step S101, determining, by the calculating device, an ecological base flow, according to the relevant data that has been stored, wherein a determination method includes an improved Montana method, an annual distribution method and a minimum monthly average flow method.

In an embodiment of the present disclosure, the calculating device can be the computer, the improved Montana method, the annual distribution method and the minimum monthly average flow method are stored in the computer by in a form of computer programs, the computer inputs the relevant data obtained in the step S100 into the computer programs to calculate the ecological base flow.

Step S102, analyzing, by the calculating device, the ecological base flows $M_1$, $M_2$ and $M_3$ respectively determined by the improved Montana method, the annual distribution method and the minimum monthly average flow method; taking a maximum value and a minimum value respectively selected from the ecological base flows $M_1$, $M_2$ and $M_3$ as an upper limit $Q_{max}$ and a lower limit $Q_{min}$ of the ecological base flow to preliminarily determine a range $[Q_{min}, Q_{max}]$ of the ecological base flow, and preliminarily determining the lower limit $Q_{min}$ of the range $[Q_{min}, Q_{max}]$ as a lower limit of the ecological base flow, shown in formulas (1) and (2):

$$Q_{min} = \min\{M_1, M_2, M_3\} \tag{1}$$

$$Q_{max} = \max\{M_1, M_2, M_3\} \tag{2}$$

Step S103, verifying, by the calculating device, the lower limit $Q_{min}$ of the ecological base flow shown in the step S102.

According to the guidelines for water resources demonstration of construction projects (Trial Implementation) in 2005, in principle, indexes of the ecological base flow in northern rivers should not be less than 10% of the multi-year average flow, and should not be less than 20% of the average flow in the same period during the dry season. If the lower limit $Q_{min}$ of the ecological base flow that has been preliminarily determined is larger than a specified value, taking the lower limit $Q_{min}$ as the lower limit of the ecological base flow; if the lower limit $Q_{min}$ of the ecological base flow that has been preliminarily determined is less than or equal to the specified value, taking the specified value as the lower limit of the ecological base flow. For any determined assessment section, the ecological base flow determined after verification can be regarded as a minimum standard of the assessment.

Step S104, calculating, by the calculating device, water demands of three service objects in the river section on the basis of the ecological base flow, wherein the water demands of the three service objects include water demand $W_l$ of landscape wetland, water demand $W_s$ of sediment discharge and water demand of dilution self-purification.

In an embodiment of the present disclosure, after the relevant data is collected in the step S100, the relevant data is stored in the computer. The water demand calculation formulas of the three service objects are stored in the computer in the form of computer programs, in this way, inputting, by the computer, the stored data into the computer programs, the water demands of the three service objects can be obtained.

Step S105, analyzing, by the calculating device, the water demands of the three service objects calculated in the step S104, to determine a lifting amount S. The lifting amount S is a range, so that a lower limit $S_{min}$ and an upper limit $S_{max}$ of the lifting amount S can be determined by finding out a minimum value and a maximum value from the water demands of the three service objects. In order to reflect changes within a year, the range of the lifting amount S is determined by months.

$$S_{min} = \min\{W_l, W_s, W_c\} \quad (3)$$

$$S_{max} = \max\{W_l, W_s, W_c\} \quad (4)$$

For example, the water demands of the three service objects are the water demand $W_l$ of the landscape wetland, the water demand $W_s$ of the sediment discharge and the water demand $W_c$ of the dilution self-purification, and the water demand of the three service objects in January are respectively: $W_{l1}=1.5$, $W_{s1}=3.2$, $W_{c1}=2.7$, the maximum value and the minimum value are $W_{s1}$ and $W_{l1}$, respectively, that is, $S_{max1}=W_{s1}=3.2$, $S_{min1}==1.5$, so that the range of the lifting amount in January is $S_1=[1.5, 3.2]$. According to this method, the range of the lifting amount from February to December can be determined to reflect the changes of the lifting amount within the year.

Step S106, combining, by the calculating device, the ecological base flow and the lifting amount S to comprehensively determine the ecological flow, taking the lower limit $Q_{min}$ of the ecological base flow verified in the step S103 as a minimum assessment standard, that is, the lower limit of the ecological flow, and taking the upper limit of the lifting amount S as an upper limit of the ecological flow, so as to obtain the ecological flow.

In the process of interval management, it is to first meet requirements of continuous flows of the river, that is, the ecological base flow reaches the minimum assessment standard, on this basis, the ecology can be improved and restored by increasing the lifting amount. Ecological water demand levels are different and water resources that can be allocated are different, so that the lifting amount can be large or small.

The ecological water demand levels are different, for example: a flow rate of 10 m³/s can ensure normal growth of aquatic organisms, a flow rate of 12 m³/s can ensure the normal growth in a short time, and a flow rate of 15 m³/s can ensure healthy growth for a long time. Then, the lifting amount firstly meets current normal growth and then is lifted in sequence.

The water resource that can be allocated is different, for example: 1. A reservoir does not store enough water at the end of a flood period, which leads to a shortage of water during a water consumption period, therefore, the lifting amount is difficult to be ensured. 2. Enough water has been stored in the reservoir during the water consumption period, so that a part of the water can be used for the ecology to increase the lifting amount.

In general, the more natural ecological flow, the better. In case of problems, targeted measures should be taken to restore and protect the water ecology as soon as possible within a period of time.

For example, if the ecological base flow is 8 m³/s, the range of the lifting amount is [5, 14], the final lifting amount can be increased on the basis of 5 m³/s. Taking the ecological base flow 8 m³/s as the lower limit of a theoretical range of the ecological flow, then the theoretical range of the ecological flow becomes [8, 14]. At present, the range of the water demand that the service object can increase a flow is [0, 6], if allocation capacity of the water resources corresponds to the range of [0, 6] is 2 m³/s, then 2 m³/s can be increased on the basis of 8 m³/s of the ecological base flow, then, the lower limit of the ecological flow is 10 m³/s.

Furthermore, in an embodiment of the present disclosure, in the step S101, the improved Montana method considers to select a typical year and determine a periodization percentage on the basis of a Montana method, the typical year selected according to a year with modulus of different seasons closest to 1.0, specifically shown in formula (5) below. The periodization is that one year is divided into a general water use period (November to March of a next year) and a fish spawning period (April to October), and taking 10% and 30% of typical annual average flows as a lower limit and an upper limit of the ecological base flow, respectively.

$$K_i = \sqrt{\left(\sum_{j=1}^{4}(K_{ij}-1)^2\right)} \quad (5)$$

Wherein, $K_i$ is a modulus of an i-th year, and $K_{ij}$ is a modulus of a j-th quarter of the i-th year, which is generally configured to select typical years.

The annual distribution method configured to obtain an annual ecological base flow process of a year by multiplying a multi-year average monthly runoff by a contemporaneous average ratio, the contemporaneous average ratio determined and quantified according to two typical hydrological characteristic variables that include the multi-year average monthly runoff and an annual average value of a minimum monthly average runoff of each month in the year, specifically shown in formulas (6)-(11):

$$\overline{Q} = \frac{1}{12}\sum_{i=1}^{12}\overline{q_i} \quad (6)$$

$$\overline{q_i} = \frac{1}{n}\sum_{j=1}^{n}q_{ij} \quad (7)$$

$$\overline{Q_{min}} = \frac{1}{12}\sum_{i=1}^{12}q_{min(i)} \quad (8)$$

$$q_{min(i)} = \min(q_{ij}) \quad (9)$$

$$\eta = \overline{Q_{min}}/\overline{Q} \quad (10)$$

$$Q_i = \overline{q_i} * \eta \quad (11)$$

Wherein, $\overline{q_i}$ is the multi-year monthly average runoff of an i-th month in a plurality of years; $\overline{Q}$ is the multi-year annual average runoff; $q_{ij}$ is a monthly average runoff of the i-th month in a j-th year; $q_{min(i)}$ is a multi-year minimum monthly average runoff of the i-th month; $\overline{Q_{min}}$ is a minimum annual average runoff; n is number of statistical years, η is the contemporaneous average ratio, and $Q_i$ is the ecological base flow of each month. Among the above parameters, $\overline{q_i}$, $\overline{Q}$, $q_{ij}$, $q_{min(i)}$, $\overline{Q_{min}}$ and η can be obtained by querying the hydrological Yearbook or data recorded by the hydrological station, and then the data that has been obtained can be input into the computer through the input device.

The minimum monthly average flow method is configured to take a multi-year average value of the minimum monthly average flow as the ecological base flow of a river channel, specifically shown in a formula (12):

$$Q_m = \sum_{i=1}^{n}\min Q_{ij}/n \quad (12)$$

Wherein, $Q_{ij}$ is an average flow of a j-th day of the i-th month, $Q_m$ is an ecological base flow of an m-th month, and n is the number of statistical years. Among the above parameters, $Q_{ij}$ can be obtained by querying data recorded by the hydrological station, and then the data that has been obtained can be input into the computer through the input device.

Furthermore, as the ecological service objects are numerous, the ecological service objects can't be refined to one grass and one tree so that it is difficult to quantify the ecological water demand. For a specific river channel, in order to illustrate the lifting amount of different river sections, the river section according to an embodiment of the present disclosure is divided into three parts: an upstream river section A1, a midstream river section A2 and a downstream river section A3. In the embodiment, the water demand of the service object is divided into the water demand $W_l$ of the landscape wetland, the water demand $W_s$ of the sediment discharge and the water demand W of the dilution self-purification. The lifting amount is given by considering the water demands of the three service objects on the basis of the ecological base flow, for example: water quality of the upstream river section A1 is better, so that $W_s$ and $W_c$ are small; more factories are arranged on both sides of the midstream river section A2 and more sewage outlets are arranged, so that $W_s$ is great; the sediment deposition in the downstream river section A3 is more serious, so that a corresponding $W_s$ is also great. Respective lifting amount of the river sections A1-A3 can be different, but all can be represented by intervals.

Specific calculation ways of the water demand $W_l$ of the landscape wetland, the water demand $W_s$ of the sediment discharge and the water demand W of the dilution self-purification in step S104 are as follows:

(1) the water demand $W_l$ of the landscape wetland, shown in a formula (13):

$$W_l = \frac{w''}{T} \quad (13)$$

Wherein, T is periods of water exchange, and w" is a multi-year average water storage.

The water demand $W_s$ of the sediment discharge: the water demand of river sediment discharge is referred that: a certain amount of water is required to be kept in the river channel in order to maintain a dynamic balance of riverbed erosion and deposition, the water quantity is directly related to the sediment concentration of water flow and changes dynamically with annual distributions of the sediment yield and the sediment concentration and the like, calculation formulas (14)-(16) shown below:

$$W_s = \eta^\alpha * W_w \quad (13)$$

$$W_w = W - W'/\gamma^s \quad (14)$$

$$\eta = S_m - S_n \quad (15)$$

Wherein, $\eta$ is efficiency of sediment discharge, $\alpha$ is an index, $W_w$ is a net water flow, W is a runoff, w' is sediment discharge, $\gamma_s$ is sediment bulk density, $S_m$ is a sediment concentration at an inflow of the river section, $S_n$ is a sediment concentration at an outflow of the river section; when $\eta<1$, the river section is in a flushing state, the sediment concentration at the inflow of the river section is less than that of the outflow of the river section, and a is 1; when $\eta>=1$, the river section is deposited or keeps a balance of erosion and deposition, and a is 0. Among the above parameters, $\eta$, $W_w$, W, w' and $\gamma_s$ can be obtained by querying the hydrological Yearbook or data recorded by the hydrological station, and then the data that has been obtained can be input into the computer through the input device.

(3) the water demand $W_c$ of the dilution self-purification: it refers to minimum water quantity required that the river body reaches a water quality target determined by water function divisions under the premise of enhancing pollution source control. Using the mixed model and the attenuation model are to simulate the water demand W of the dilution self-purification in the river section. At an i-th section of the river section, an upper section is $A_{i-1}$, a lower section is $A_i$, a length of the river section is $L_i$, it is assumed that pollutant of a plurality of sewage outlets and branches are imported into the river section, for convenience of calculation, which are recorded as a section B, a specific formula shown in a formula (17):

$$W_{ci} = \frac{C_{i-1}Q_{i-1}\exp\left(-\frac{kL_i}{u_i}\right)_i + q_i s_i \exp\left(-\frac{k(L_i - x_i)}{u_i}\right) - C_{si}q_i}{C_{si}} * T \quad (17)$$

Wherein, $W_{ci}$ is the water demand of the dilution self-purification of the i-th river section, $C_{i-1}$ is a pollutant concentration at the upper section $A_{i-1}$, is a pollutant concentration imported into the section B, $q_i$ is an import flow at the section B, $C_{si}$ is a target water quality concentration at the lower section Ai, $L_i$ is a length of the river section, $u_i$ is a current velocity at the i-th section of the river section, $x_i$ is a distance between the section B and the upper section $A_{i-1}$, and $Q_{i-1}$ is a flow at the upper section $A_{i-1}$. Among the above parameters, $q_i$, $u_i$ and $Q_{i-1}$ can be obtained by querying the hydrological Yearbook or data recorded by the hydrological station, $L_i$ and $x_i$ can be measured on a map, and then the data that has been obtained can be input into the computer through the input device.

In an embodiment of the present disclosure, a hydraulic method, a habitat method or an integral method can also be used to calculate the ecological base flow. An erosion and deposition correction method can also be used to calculate the water demand of sediment discharge, and a lake form method can also be used to calculate the water demand of the landscape wetland. Other river routing methods can also be used to verify the ecological base flow, the periodization can also be adopted to a rich mode, a flat mode and a withered mode; a frequency analysis method can also be used for determining typical years.

The ecological flow determination method provided in the embodiment of the present disclosure can meet requirements of watershed or regional assessment managements, on the basis of the ecological base flow, the lifting amount is given, the lifting amount is the water demand level given by considering water demand conditions of specific service objects in a specific river section under different spatial and temporal distributions. Then, the range is given by using an idea of interval, and the ecological flow is taken as an evaluation standard, which can ensure the continuous flows of the river, in this way, the assessment is reasonable and effective. On the basis of interval management of the lifting amount, the water ecological environment can be improved and restored by deployment decisions to meet requirements of the ecological management.

The above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure.

What is claimed is:

1. An ecological flow determination method for considering a lifting amount, the height that a waterway needing to rise, comprising the following steps:

step S100, collecting and storing, by a collecting device, relevant data needed to calculate an ecological flow;

step S101, determining, by a calculating device, an ecological base flow, according to the relevant data that has been stored, wherein a determination method comprises an improved Montana method, an annual distribution method and a minimum monthly average flow method;

step S102, analyzing, by the calculating device, the ecological base flows M1, M2 and M3 respectively determined by the improved Montana method, the annual distribution method and the minimum monthly average flow method; taking a maximum value and a minimum value respectively selected from the ecological base flows M1, M2 and M3 as an upper limit Qmax and a lower limit Qmin of the ecological base flow to preliminarily determine a range [Qmin, Qmax] of the ecological base flow, and preliminarily determining the lower limit Qmin of the range [Qmin, Qmax] as a lower limit of the ecological base flow, shown in formulas (1) and (2):

$$Q\min = \min\{M1, M2, M3\} \quad (1)$$

$$Q\max = \max\{M1, M2, M3\} \quad (2)$$

step S103, verifying, by the calculating device, the lower limit Qmin of the ecological base flow shown in the step S102;

if the lower limit Qmin of the ecological base flow that has been preliminarily determined is larger than a specified value, taking the lower limit Qmin as the lower limit of the ecological base flow; if the lower limit Qmin of the ecological base flow that has been preliminarily determined is less than or equal to the specified value, taking the specified value as the lower limit of the ecological base flow;

step S104, calculating, by the calculating device, water demands of three service objects in a river section on the basis of the ecological base flow, wherein the water demands of the three service objects comprise water demand Wl of landscape wetland, water demand Ws of sediment discharge and water demand Wc of dilution self-purification;

step S105, analyzing, by the calculating device, the water demands of the three service objects calculated in the step S104, to determine a lifting amount S;

determining a minimum value and a maximum value of the water demands of the three service objects, and respectively taking the minimum value and the maximum value of the water demands of the three service objects that has been determined as a lower limit Smin and an upper limit Smax of the lifting amount S;

$$S\min = \min\{Wl, Ws, Wc\} \quad (3)$$

$$S\max = \max\{Wl, Ws, Wc\} \quad (4)$$

step S106, combining, by the calculating device, the ecological base flow and the lifting amount S to comprehensively determine the ecological flow, and then transmitting the ecological flow to an output device to assess the watershed or regional; and taking the lower limit of the ecological base flow verified in the step S103 as a lower limit of the ecological flow, and taking the upper limit of the lifting amount S as an upper limit of the ecological flow;

wherein the collecting device comprises a measuring device, the measuring device comprises sensors; the process "collecting and storing, by a collecting device" comprising obtaining data of the pollutant concentration and the water quality concentration by sensors of the measuring device, and then transmitting the data to the computer and storing the data by the computer;

wherein in the step S101, the improved Montana method considers to select a typical year and determine a periodization percentage on the basis of a Montana method, the typical year selected according to a year with a modulus of different seasons closest to 1.0; the periodization is that one year is divided into a general water use period and a fish spawning period, and 10% and 30% of an average flow of the typical year taken as the ecological base flow, respectively, that is 10% is a periodization percentage of the general water use period, and 30% is a periodization percentage of the fish spawning period;

the annual distribution method configured to obtain an annual ecological base flow process of a year by multiplying a multi-year average monthly runoff by a contemporaneous average ratio, the contemporaneous average ratio determined and quantified according to two typical hydrological characteristic variables that comprise the multi-year annual average runoff and an annual average value of a minimum monthly average runoff of each month in the year, specifically shown in formulas (5)-(10):

$$\overline{Q} = \frac{1}{12} \sum_{i=1}^{12} \overline{q_i} \quad (5)$$

$$\overline{q_i} = \frac{1}{n} \sum_{j=1}^{n} q_{ij} \quad (6)$$

$$\overline{Q_{min}} = \frac{1}{12} \sum_{i=1}^{12} q_{min(i)} \quad (7)$$

$$q_{min(i)} = \min(q_{ij}) \quad (8)$$

$$\eta = \overline{Q_{min}} / \overline{Q} \quad (9)$$

$$Q_i = \overline{q_i} * \eta \quad (10)$$

wherein, $\overline{q_i}$ is the multi-year monthly average runoff of an i-th month; $\overline{Q}$ is the multi-year annual average runoff; $q_{ij}$ is a monthly average runoff of the i-th month in a j-th year; $q_{min(i)}$ is a multi-year minimum monthly average runoff of the i-th month; $\overline{Q_{min}}$ is a minimum annual average runoff; n is number of statistical years, $\eta$ is the contemporaneous average ratio, and $Q_i$ is the ecological base flow of each month;

the minimum monthly average flow method configured to take a multi-year average value of a minimum monthly average flow as the ecological base flow of a river channel, specifically shown in a formula (11):

$$Q_m = \sum_{i=1}^{n} \min Q_{ij} / n \quad (11)$$

wherein, $Q_{ij}$ is an average flow of a j-th day of the i-th month, $Q_m$ is an ecological base flow of an m-th month, and n is the number of statistical years.

2. The method as claimed in claim 1, wherein the step S100 of collecting the relevant data by the collecting device, comprises a river sediment concentration, a sediment discharge, a period of water exchange, a multi-year average water storage, a pollutant concentration, a target water quality concentration and long-series historical flow data.

3. The method as claimed in claim 1, wherein specific calculation ways of the water demand Wl of the landscape wetland, the water demand Ws of the sediment discharge and the water demand Wc of the dilution self-purification in the step S104 are as follows:

(1) the water demand Wl of the landscape wetland, shown in a formula (12):

$$W_l = \frac{w''}{T} \tag{12}$$

wherein, T is periods of water exchange, and w" is a multi-year average water storage;

(2) the water demand Ws of the sediment discharge shown in formulas (13)-(15):

$$W_s = \eta^\alpha * W_w \tag{13}$$

$$W_w = W - W'/\gamma_s \tag{14}$$

$$\eta = S_m - S_n \tag{15}$$

wherein, $\eta$ is efficiency of sediment discharge, $\alpha$ is an index, $W_w$ is a net water flow, W is a runoff, W' is sediment discharge, $\gamma_s$ is sediment bulk density, $S_m$ is a sediment concentration at an inflow of the river section, $S_n$ is a sediment concentration at an outflow of the river section; when $\eta<1$, the river section is in a flushing state, the sediment concentration at the inflow of the river section is less than that of the outflow of the river section, and $\alpha$ is 1; when $\eta>=1$, the river section is deposited or keeps a balance of erosion and deposition, and $\alpha$ is 0;

(3) the water demand Wc of the dilution self-purification, using a mixed model and an attenuation model are to simulate the water demand Wc of the dilution self-purification in the river section.

* * * * *